(12) United States Patent
Otsuka et al.

(10) Patent No.: US 11,545,150 B2
(45) Date of Patent: Jan. 3, 2023

(54) DIALOG DEVICE, DIALOG METHOD, DATA STRUCTURE, AND PROGRAM

(71) Applicant: NIPPON TELEGRAPH AND TELEPHONE CORPORATION, Tokyo (JP)

(72) Inventors: Atsushi Otsuka, Tokyo (JP); Ko Mitsuda, Tokyo (JP); Taichi Katayama, Tokyo (JP); Junji Tomita, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 158 days.

(21) Appl. No.: 16/978,661

(22) PCT Filed: Mar. 4, 2019

(86) PCT No.: PCT/JP2019/008474
§ 371 (c)(1),
(2) Date: Sep. 4, 2020

(87) PCT Pub. No.: WO2019/172205
PCT Pub. Date: Sep. 12, 2019

(65) Prior Publication Data
US 2021/0043206 A1  Feb. 11, 2021

(30) Foreign Application Priority Data
Mar. 8, 2018 (JP) .............................. JP2018-042136

(51) Int. Cl.
*G10L 15/22* (2006.01)
*G10L 15/06* (2013.01)
*G10L 15/16* (2006.01)

(52) U.S. Cl.
CPC ............ *G10L 15/22* (2013.01); *G10L 15/063* (2013.01); *G10L 15/16* (2013.01)

(58) Field of Classification Search
CPC ....... G10L 15/22; G10L 15/063; G10L 15/16; G10L 15/30; G06N 5/022; G06F 16/00; G06F 16/90; G06F 40/35
See application file for complete search history.

(56) References Cited

U.S. PATENT DOCUMENTS

2011/0054899 A1* 3/2011 Phillips .................. G10L 15/30
704/235
2014/0142938 A1* 5/2014 Takeuchi ................ G10L 15/26
704/235

(Continued)

OTHER PUBLICATIONS

Otsuka, Atsushi, "Estimation of User Response Candidates in Conversation Scenario Construction," The 31st Annual Conference of the Japanese Society for Artificial Intelligence, 2017.

*Primary Examiner* — Michael Colucci

(57) ABSTRACT

Provided are a dialogue device, a dialogue method, a data structure, and a program capable of realizing various dialogues while reducing the amount of description of a dialogue scenario.
A knowledge transition unit 120 determines a next type of knowledge based on: a knowledge base 130 in which a relation label indicating each of relations between a plurality of types of knowledge is attached to knowledge about each of utterances to express the knowledge about the utterance; a user utterance; current knowledge; and a dialogue scenario including a basic scenario in which a transition method between the plurality of types of knowledge in the knowledge base is determined using the relation label, and an utterance generation unit 150 generates a system utterance based on the next type of knowledge.

20 Claims, 7 Drawing Sheets

(56) References Cited

U.S. PATENT DOCUMENTS

| | | | |
|---|---|---|---|
| 2015/0149177 A1* | 5/2015 | Kains | G10L 15/1822 704/257 |
| 2016/0012818 A1* | 1/2016 | Faizakof | G10L 15/063 704/245 |
| 2018/0196796 A1* | 7/2018 | Wu | G06N 5/022 |

* cited by examiner

Fig. 6

```
<category>
  <pattern> SMARTPHONE * DO NOT NEED * </pattern>
    <template>
        <pattern> HIGH </pattern>
        <template> goto: 4 </template>
        <pattern> VIRUS </pattern>
        <template> goto: 2 </template>
        <that> WHY DON'T YOU NEED IT? </that>
    </template>
</category>
```

I DO NOT NEED SMARTPHONE

WHY DON'T YOU NEED IT?  * USER SCENARIO

I'M AFRAID OF VIRUS

SMARTPHONE CAN USE USEFUL APPLICATION  * USER SCENARIO TO NODE 2

TERMINAL IS EXPENSIVE

BUT, IT IS CHEAPER THAN PC  * BASIC SCENARIO NODE 1 → 4

DIALOG DEVICE, DIALOG METHOD, DATA STRUCTURE, AND PROGRAM

CROSS-REFERENCE TO RELATED APPLICATIONS

This application is a U.S. 371 Application of International Patent Application No. PCT/JP2019/008474, filed on 4 Mar. 2019, which application claims priority to and the benefit of JP Application No. 2018-042136, filed on 8 Mar. 2018, the disclosures of which are hereby incorporated herein by reference in their entireties.

TECHNICAL FIELD

The present invention relates to a dialogue device, a dialogue method, a data structure, and a program, and more particularly, to a dialogue device, a dialogue method, a data structure, and a program capable of realizing a flexible dialogue at low cost.

BACKGROUND ART

In recent years, a dialogue system for having a dialogue with a computer or a robot has received attention as one of AI technologies. The dialogue system is realized in such a manner that the system repeats an appropriate reply in response to a user's input utterance.

The dialogue system can be broadly divided into a scenario-type dialogue system and a statistical-type dialogue system. The scenario-type dialogue system is realized by describing a large number of response rules in advance in the dialogue system (Non-Patent Literature 1).

CITATION LIST

Non-Patent Literature

Non-Patent Literature 1: Atsushi OTSUKA, Taichi KATAYAMA, Hiroaki SUGIYAMA, Ryuichiro HIGASHI-NAKA, and Yoshihiro MATSUO, "Predicting User Answer Candidates for Creating Dialogue Scenario", The $31^{st}$ Annual Conference of the Japanese Society for Artificial Intelligence, 1B3-2, 2017

SUMMARY OF THE INVENTION

Technical Problem

The scenario-type dialogue system can provide high-quality dialogue as long as a user utterance follows a dialogue scenario. On the other hand, since the system can hardly reply in response to an utterance which does not exist in the scenario, it is necessary to match more user utterances with the dialogue scenario.

However, there are problems that a large amount of cost is consumed to create the dialogue scenario and a huge amount of response rules need to be described so as to perform a long-time dialogue.

An object of the present invention, which has been made in view of the above circumstances, is to provide a dialogue device, a dialogue method, a data structure, and a program capable of realizing various dialogues while reducing the amount of description of a dialogue scenario.

Means for Solving the Problem

The present invention provides a dialogue device that, based on a user utterance, generates a system utterance based on a predetermined dialogue scenario, the dialogue device including: a knowledge base in which a relation label indicating each of relations between a plurality of types of knowledge is attached to knowledge about each of utterances to express the knowledge about the utterance; a scenario database that stores a dialogue scenario including a basic scenario in which a transition method between the plurality of types of knowledge in the knowledge base is determined using the relation label; an utterance understanding unit that sets current knowledge from the plurality of types of knowledge in the knowledge base, based on an input user utterance; a knowledge transition unit that determines transition-destination knowledge in the knowledge base, based on the user utterance, the current knowledge set by the utterance understanding unit, and the basic scenario; and an utterance generation unit that generates the system utterance based on the transition-destination knowledge determined by the knowledge transition unit.

The present invention provides a dialogue method in a dialogue device that, based on a user utterance, generates a system utterance based on a predetermined dialogue scenario, the dialogue device including: a knowledge base in which a relation label indicating each of relations between a plurality of types of knowledge is attached to knowledge about each of utterances to express the knowledge about the utterance; and a scenario database that stores a dialogue scenario including a basic scenario in which a transition method between the plurality of types of knowledge in the knowledge base is determined using the relation label. In the dialogue method, an utterance understanding unit sets current knowledge from the plurality of types of knowledge in the knowledge base, based on an input user utterance, a knowledge transition unit determines transition-destination knowledge in the knowledge base, based on the user utterance, the current knowledge set by the utterance understanding unit, and the basic scenario, and an utterance generation unit generates the system utterance based on the transition-destination knowledge determined by the knowledge transition unit.

The dialogue device and the dialogue method according to the present invention include the knowledge base in which the relation label indicating each of relations between the plurality of types of knowledge is attached to the knowledge about each of utterances to express the knowledge about the utterance; and the scenario database that stores the dialogue scenario including the basic scenario in which the transition method between the plurality of types of knowledge in the knowledge base is determined using the relation label.

Then, the utterance understanding unit sets the current knowledge from the plurality of types of knowledge in the knowledge base, based on the input user utterance, the knowledge transition unit determines the transition-destination knowledge in the knowledge base, based on the user utterance, the current knowledge set by the utterance understanding unit, and the basic scenario, and the utterance generation unit generates the system utterance based on the transition-destination knowledge determined by the knowledge transition unit.

As described above, it is possible to realize various dialogue while reducing the amount of description of the dialogue scenario by determining a next type of knowledge based on: the knowledge base in which the relation label indicating each of relations between the plurality of types of knowledge is attached to the knowledge about each of utterances to express the knowledge about the utterance; the user utterance; the current knowledge; and the dialogue scenario including the basic scenario in which the transition method between the plurality of types of knowledge in the knowledge base is determined using the relation label, and generating the system utterance based on the next type of knowledge.

In addition, the dialogue scenario of the dialogue device according to the present invention further includes a user scenario in which a transition method between a plurality of types of knowledge in the knowledge base based on contents of a specific dialogue is determined, and the knowledge transition unit preferentially can use the user scenario to determine transition-destination knowledge in the knowledge base, based on the user utterance, and determine the transition-destination knowledge based on the basic scenario, the user utterance, and the current knowledge when the transition-destination knowledge is not determined using the user scenario.

In addition, the knowledge transition unit of the dialogue device according to the present invention preferentially can use the same user scenario to determine transition-destination knowledge in the knowledge base based on the user utterance when a previous user utterance satisfies a predetermined condition determination in the user scenario, the knowledge transition unit preferentially can use the user scenario to determine transition-destination knowledge in the knowledge base based on the user utterance when the transition-destination knowledge is not determined using the same user scenario, and the knowledge transition unit can determine transition-destination knowledge in the knowledge base based on the basic scenario, the user utterance, and the current knowledge when the transition-destination knowledge is not determined using the user scenario.

Further, the present invention provides a data structure of a dialogue scenario used for a process in which a dialogue system generates a system utterance with respect to a user utterance based on a knowledge base in which a relation label indicating each of relations between a plurality of types of knowledge is attached to knowledge about each of a first utterance and a second utterance following the first utterance to express the knowledge about the utterance, the data structure including: a first transition rule in which, for each attribute of an utterance prepared in advance, an order of utterances following the utterance of the attribute is expressed by a transition rule of the relation label; a second transition rule in which an order of utterances defined without depending on the attribute of the utterance is expressed by the transition rule of the relation label; and priority information indicating a priority between the first transition rule and the second transition rule for each attribute of the utterance, wherein the dialogue system is used in the process of generating the system utterance, which is an utterance following the user utterance, from the knowledge base according to the transition rule selected according to the priority information from the first transition rule and the second transition rule corresponding to an attribute of an input user utterance.

The present invention provides a program for causing a computer to function as each of the units of the dialogue device described above.

Effects of the Invention

According to the dialogue device, the dialogue method, the data structure, and the program of the present invention, it is possible to realize various dialogues while reducing the amount of description of the dialogue scenario.

BRIEF DESCRIPTION OF DRAWINGS

FIG. 6 is a view showing an example of a user scenario according to the embodiment of the present invention.

DESCRIPTION OF EMBODIMENTS

An embodiment of the present invention will be described below with reference to the drawings.

<Overview of Dialogue Device According to Embodiment of Present Invention>

First, an outline of the embodiment of the present invention will be described.

Figure 2:
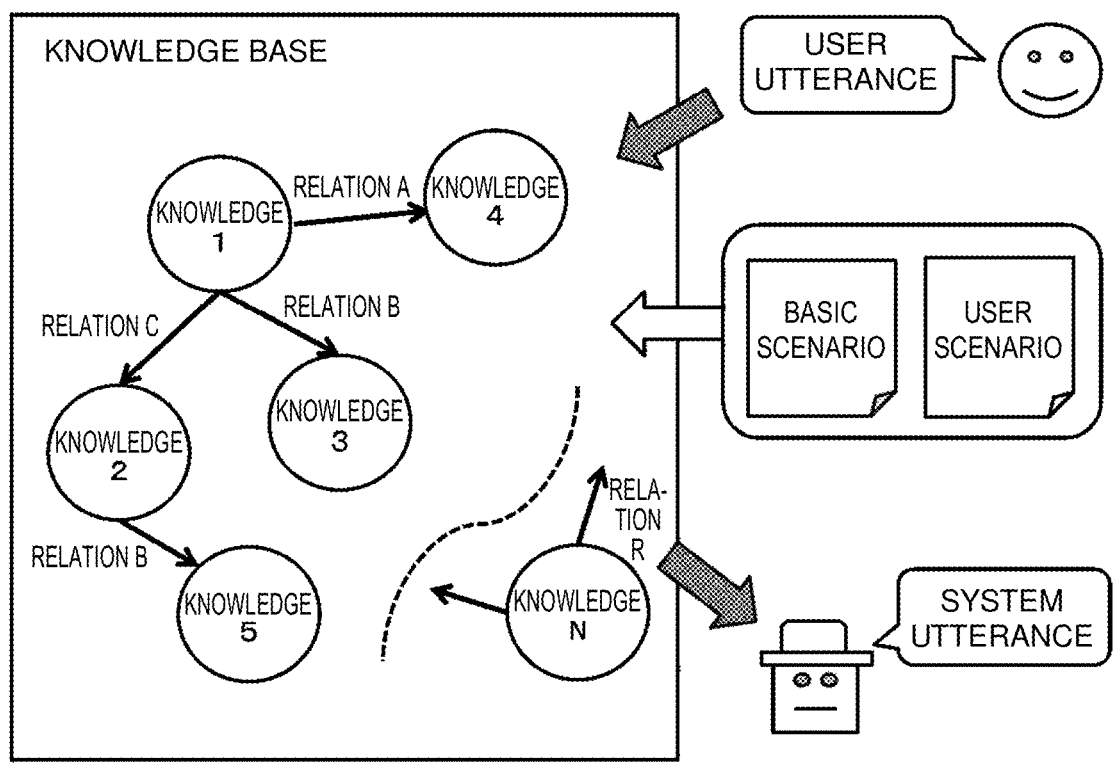
FIG. 2 is an image view showing an outline of the dialogue device of the embodiment of the present invention.

The embodiment of the present invention provides a scenario-type dialogue system configured by a combination of a knowledge base and a dialogue scenario in which response rules are described. FIG. 2 shows an outline of the dialogue device according to the present embodiment.

A knowledge base is constructed in advance in which a relation between common-sense situations are stored, and a dialogue is performed by transition on the knowledge base. In other words, as shown in FIG. 2, a user utterance is mapped to knowledge on the knowledge base, and a system utterance is generated based on the knowledge.

Here, the user utterance in the present embodiment is text information given as an input to the dialogue system, and indicates a target to which the system returns a reply. The user utterance does not necessarily need to be input by a user (human). In addition, the user utterance may be a text that is a voice recognition result.

In the present embodiment, the dialogue scenario is divided into two scenarios, for example, a basic scenario that defines a transition of the knowledge base during normal times and a user scenario that is added later by the user. A sufficient dialogue can be realized when only the knowledge base and the basic scenario are prepared, but a more complicated dialogue can be realized when the user scenario is prepared.

In the dialogue scenario using the knowledge base and the basic scenario, the system determines whether the input utterance of the user is close to an utterance of any knowledge on the knowledge base, and the system replies a knowledge utterance connected to the knowledge.

At this time, the transition to which knowledge is described by the basic scenario. The basic scenario defines edge priorities and conditions as rules for determining the next knowledge to be transitioned (output: corresponding to the system utterance) with respect to the current knowledge (input: corresponding to the user utterance) during a dialogue.

Here, since the basic scenario describes a transition method, a response rule relating to detailed contents of utterance can hardly be described. Therefore, the user scenario is used which describes a response rule relating to the detailed contents of utterance.

The user scenario freely describes a specific situation and a transition between various types of knowledge other than those defined in the basic scenario (relating to the content of each knowledge (utterance sentence)). In other words, each of the user scenario describes activation conditions and information on a concrete behavior to be taken by the system.

According to the present embodiment, the advantage of constructing the dialogue system is that the knowledge base acting as an information source of the utterance of the system and the dialogue scenario for determining a dialogue strategy can be separated from each other.

All conventional scenario-type dialogues are described in utterance units. Therefore, when one response rule is described, it is necessary to inevitably describe at least one utterance sentence. In addition, since the cost of creating the dialogue scenario is extremely high, and it is necessary to describe enormous response rules so as to perform a dialog for a long period.

However, according to the present embodiment, since all the utterance sentences of the system utterance are created using the information on the knowledge on the knowledge base, it is not necessary to write a new utterance sentence. In addition, since the response rules are also expressed as transition rules between various types of knowledge on the knowledge base, there is an advantage that the amount of description of the dialogue scenario can be significantly reduced.

Further, even when the contents of the knowledge base is changed, it is possible to construct a dialogue system using the same basic scenario. The reason is because the knowledge base can be used unlike the conventional dialogue scenario and thus the utterance sentence itself need not be described in the basic scenario.

In addition, since the knowledge base is created based on common-sense knowledge, it can be reused in different dialogue systems.

In other words, the basic scenario is changed even from the same knowledge base by control of the dialogue strategy with the basic scenario, and thus there is an advantage that various variations of the dialogue system can be realized.

Figure 3:
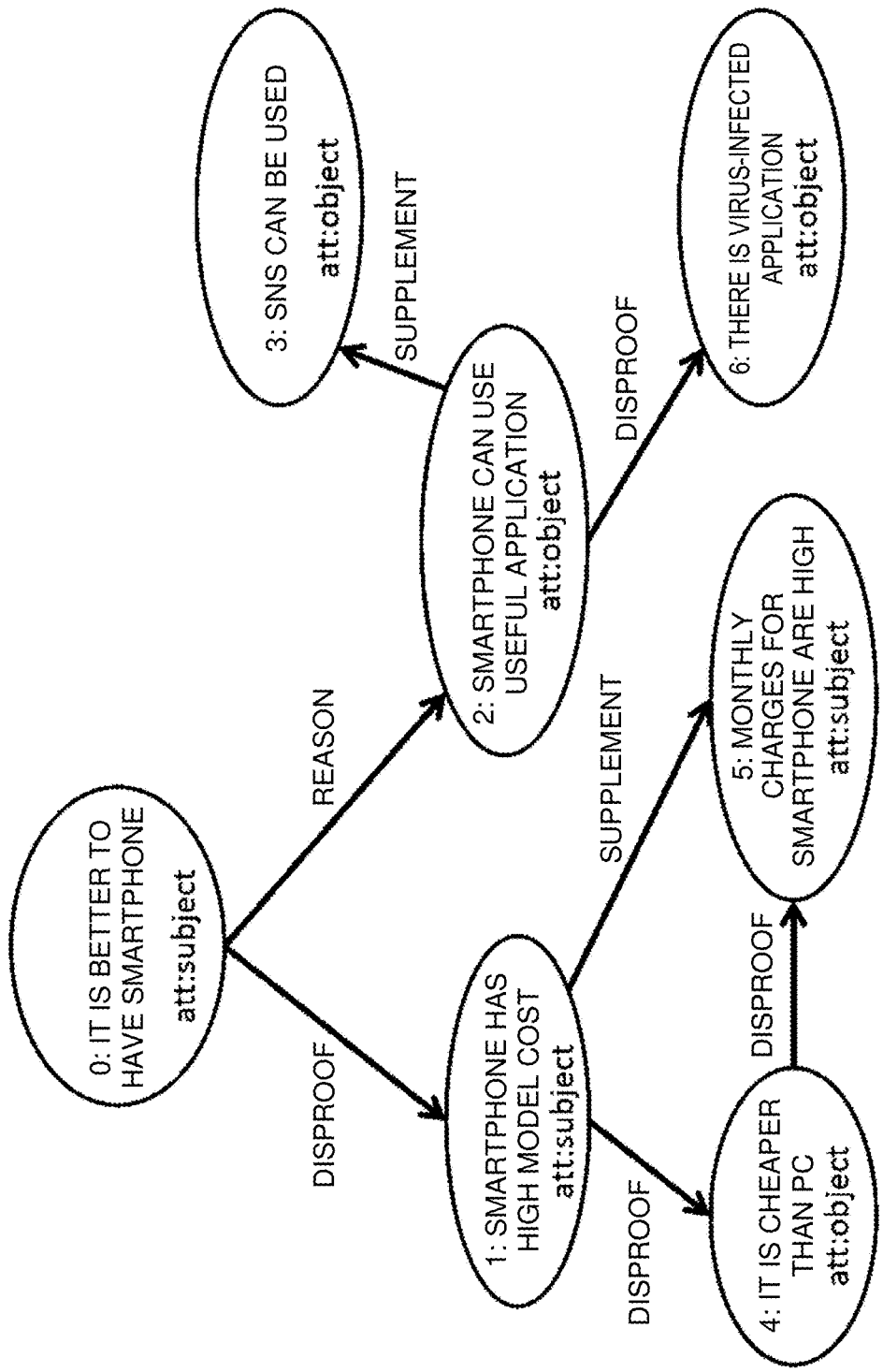
FIG. 3 is a view showing an example of a structure of a knowledge base according to the embodiment of the present invention.

For example, when the system causes the knowledge base shown in FIG. 3 to preferentially utter the knowledge that is constantly disproved in the basic scenario, the dialogue system sets forth only a counterargument. On the other hand, when the definition is made to constantly transition to the knowledge of reason or supplement, an affirmative dialogue system can be realized for the user.

In addition, the user scenario can describe, for example, a jump from a current state to a distant knowledge on the knowledge base, which does not normally transition in the basic scenario in which general transition rules are defined. For this reason, a more flexible dialogue can be performed by the use of the user scenario.

<Configuration of Dialogue Device According to Embodiment of the Present Invention>

Figure 1:
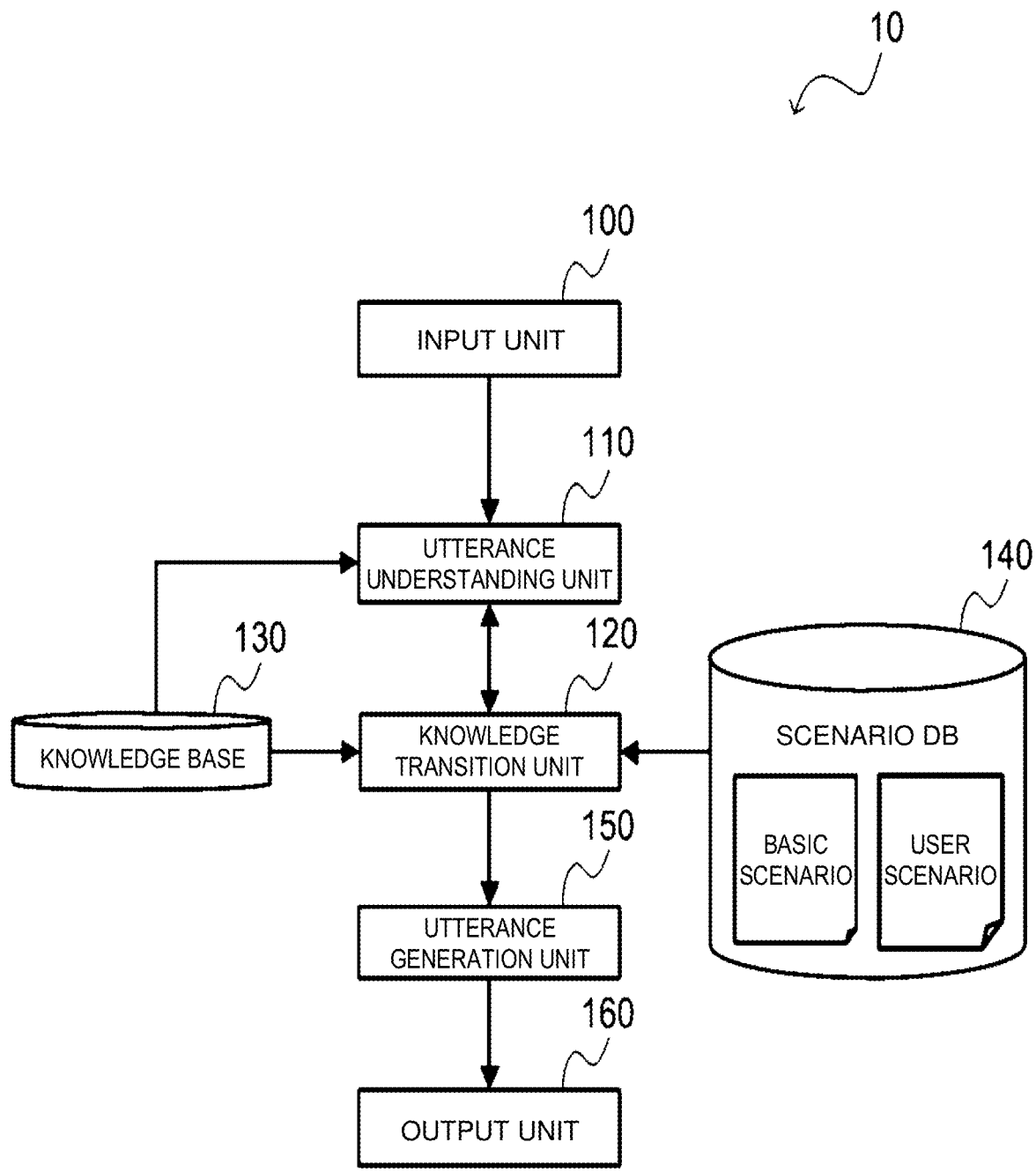
FIG. 1 is a block diagram showing a configuration of a dialogue device according to an embodiment of the present invention.

A configuration of the dialogue device according to the embodiment of the present invention will be described with reference to FIG. 1. FIG. 1 is a block diagram showing the configuration of the dialogue device according to the embodiment of the present invention.

A dialogue device 10 is configured by a computer including a CPU, a RAM, and a ROM which stores a program for executing a dialogue processing routine to be described below, and is functionally configured as follows.

As shown in FIG. 1, the dialogue device 10 according to the present embodiment includes an input unit 100, an utterance understanding unit 110, a knowledge transition unit 120, a knowledge base 130, a scenario DB (database) 140, an utterance generation unit 150, and an output unit 160.

The knowledge base 130 includes knowledge about the utterance and a relation label indicating a relation between the utterances.

Specifically, the knowledge base 130 includes a plurality of nodes including knowledge about the utterance and edges that allows the nodes to connect to each other and indicates a relation label between the nodes. As shown in FIG. 2, the knowledge base 130 has a knowledge structure that can be expressed by three sets of directed graphs in which the relations between the nodes are indicated by headedge-tail. Further, the knowledge structure may be an undirected graph without being limited to the directed graph.

The node includes an utterance sentence, knowledge capable of corresponding to an external utterance sentence, and knowledge about specific behavior (hereinafter, collectively referred to as an utterance sentence for convenience). Each of the nodes is assigned with an ID for node identification.

The node freely describes an [attribute] of the node as meta information. Information of the [attribute] may be anything as long as it is related to the knowledge of the node.

Further, the node is connected to another node at one or more edges. A [relation label] for defining the relation between the nodes is written on the edge. Information of the [relation label] may be anything as long as it indicates a relationship between the nodes.

The knowledge of the node corresponds to the contents of the utterance sentence, and can be set freely. A method of creating the knowledge base 130 can be freely set regardless of manual or automatic operation.

FIG. 3 shows an example of the knowledge base 130. Each of the nodes indicates a system utterance itself (utterance sentence). Each of the nodes is assigned with an [attribute], for example, a [subject] indicating a subjective matter or an [object] indicating an objective fact.

The edge between the nodes is assigned with a [relation label] such as "disproof", "supplement", or "reason". For example, as a [reason] that "It is better to have a smartphone", there is knowledge of [object] (objective fact) that "A smartphone can use an application".

The scenario DB 140 stores dialogue scenarios including a basic scenario in which a transition method between various types of knowledge in the knowledge base 130 is determined using the relation label and a user scenario in which a transition method between various types of knowledge in the knowledge base 130 is determined based on the contents of the specific dialogue.

<<Basic Scenario>>

The basic scenario defines a general transition method between the nodes in the knowledge base 130. At the time of dialogue, the basic scenario defines edge priorities and conditions as rules for determining the next node (corresponding to the system utterance) to be transitioned to the current node (corresponding to the user utterance).

Information defined in the basic scenario can include information on the [relation label] of the edge of the knowledge base 130 and its [direction] and information on the [attribute] of the node. The basic scenario is created based on the structural definitions of the knowledge base 130, for example, the [relation label], the [direction], and the [attribute], without depending on the knowledge content (utterance sentence) of each node.

Thus, when the amount of knowledge of the knowledge base 130 is expanded (that is, when the number of nodes is increased), a dialogue system using a new knowledge base 130 can be constructed without changing the basic scenario.

In the knowledge base 130, since there is not always the edge corresponding to all the relation labels for one node, the basic scenario is described so that the transition cannot occur from the node (the system utterance cannot be generated).

In addition, when the rules of the basic scenario do not apply, a transition-destination node may be determined at random.

Figure 4:
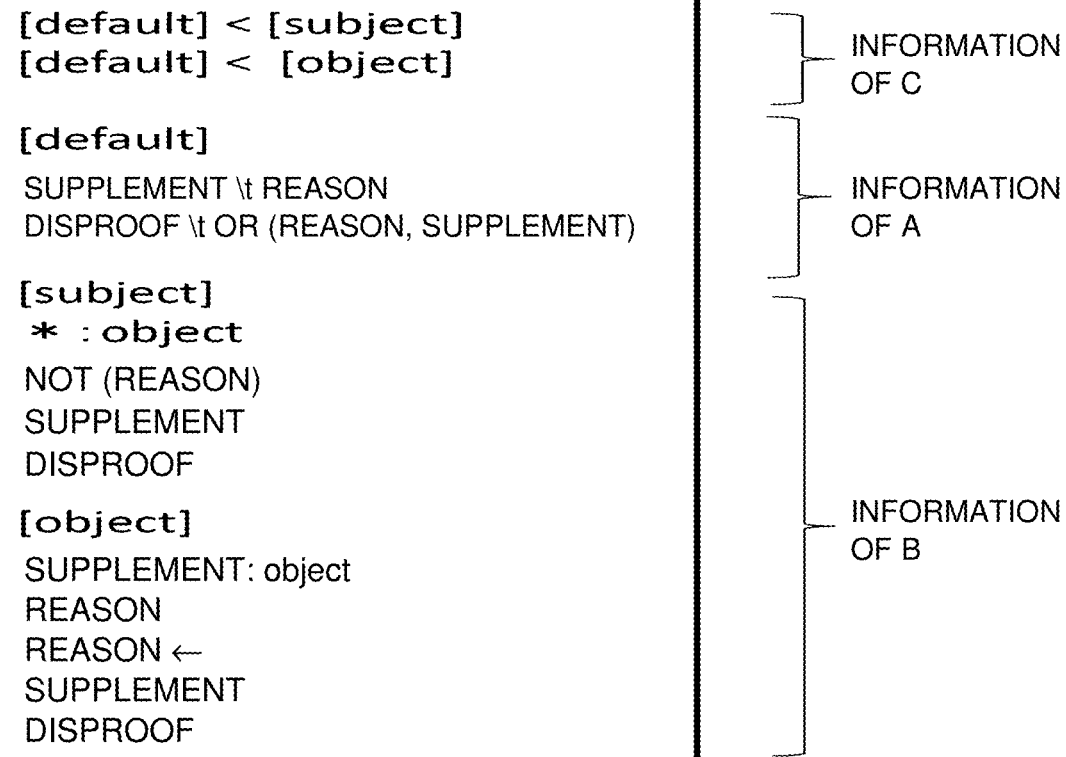
FIG. 4 is a view showing an example of a basic scenario according to the embodiment of the present invention.

The rules of the basic scenario roughly include the following information of A, B, and C (see FIG. 4).

There are three types of A: a normal transition rule [default], B: a transition rule defined for each [attribute] of the current node, and C: priority of A and B described above.

A and B are information on the priority of the [relation label] and the [direction] of the edge when determining the transition-destination node from the current node and information on the number of transitions (how many nodes do transition at a time).

In FIG. 4, when a plurality of times of transitions are made, the relation labels are arranged in "\t" (tab delimited). In other words, an example of "supplement \t reason" means that a transition is performed toward a node in a forward direction of the edge assigned with a relation label of "supplement" and a transition is further made from such a node to a node in a forward direction of the edge assigned with a relation label of "reason".

Further, an example of "OR (reason, supplement)" indicates that a transition destination is a reason or a supplement, and an example of "NOT (reason)" means that a transition is performed toward a node ahead of the edge corresponding to the relation label other than "reason". In addition, an example of "supplement: object" means that, when an attribute of a node in a forward direction of the edge assigned with a relation label of "supplement" is [object], a transition is made toward the node.

Further, an example of "*: object" means that a transition is made toward a node having an attribute of [object], regardless of the relation label. An example of "reason←" means that a transition is made retroactively to the edge assigned with the relation label of "reason".

The above-described C is information on the priority of the [default] of A and each [attribute] of B.

As the minimum information, only A may be described. A regular expression is described in the example of FIG. 4, but any description method may be used as long as following the above.

As described above, various transition rules can be described in the basic scenario for each node of the knowledge base 130, and various dialogues can be realized according to the knowledge base 130.

Figure 5:
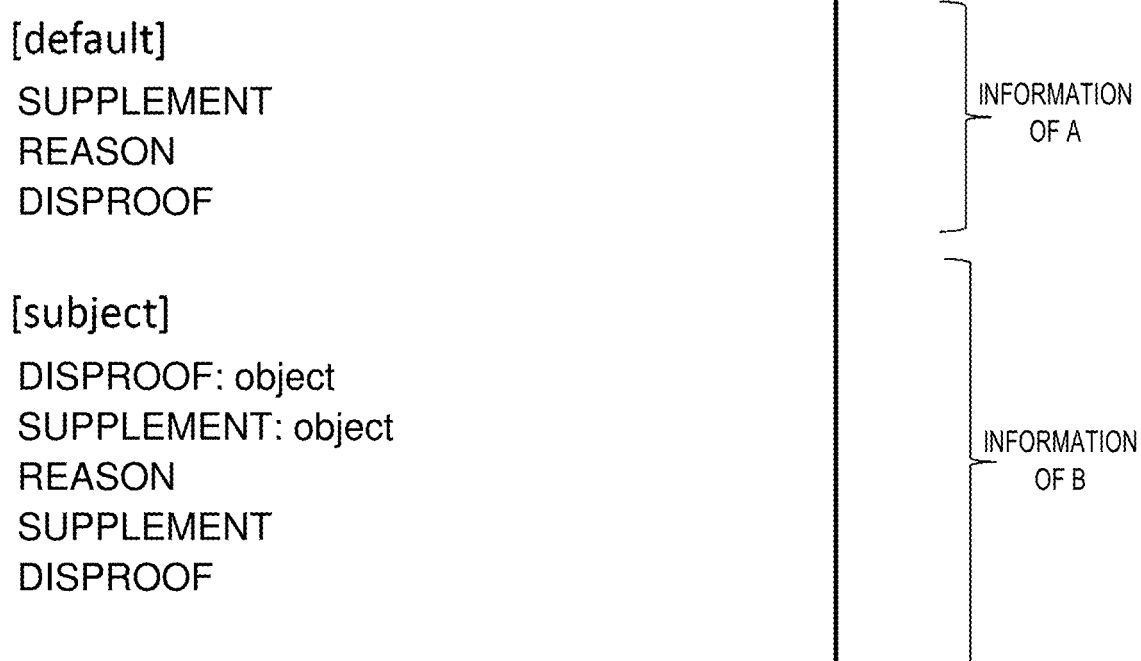
FIG. 5 is a view showing another example of a basic scenario according to the embodiment of the present invention.

FIG. 5 shows an example of the basic scenario. FIG. 5 shows a basic scenario corresponding to the knowledge base of FIG. 3, and a field of [default] indicates a normal transition. In FIG. 5, the information of C is not presented.

An example of FIG. 5 indicates that a transition of the node is performed in the order of priority of "supplement", "reason", and "disproof". A field of [subject] is the order when the attribute of the current node (node matched with the user utterance) is [subject], and a node transition is performed in the order of priority of "disproof: object", "supplement: object", "reason", "supplement", and "disproof".

Here, the "disproof: object" is a rule that "the edge with the transition node is disproof, and the attribute of the transition node is object". The "disproof" indicates a node to which a transition-destination node is connected by a disproof edge other than [object].

<<User Scenario>>

The user scenario defines and describes a transition destination of a node based on specific contents of an utterance. For example, the user scenario describes behaviors of the dialogue system other than those defined in the basic scenario (related to the knowledge content (utterance sentence) of each node).

A description method of the user scenario can follow, for example, the notation and description method (such as AIML to be described below) of an existing scenario dialogue system.

Rules defined in the user scenario can be freely described with respect to the content of the user utterance, the content of the system utterance, and the content of the utterance sentence of each node.

In the scenario of the existing dialogue system, when the activation conditions (predetermined rules) set for each scenario matches with the user utterance, a specific action to be taken by the system and the content of the utterance (system utterance sentence) are described as rules. Further, not only the system utterance sentence but also an ID of a transition-destination node can be written on the user scenario. In this case, the utterance of the ID of the designated transition-destination node is performed. In the user scenario, conditions for applying the rules are also described.

FIG. 6 shows an example of the user scenario. The user scenario follows the notation of AIML which is a markup language for the dialogue scenario. An example of FIG. 6 indicates a user scenario that is activated when the user utters "I do not need a smartphone", that is, when keywords of "smartphone" and "I do not need" are included in the user utterance.

In the user scenario of FIG. 6, when the user scenario is activated, the system unconditionally performs a system utterance of "Why don't you need it?".

Then, when the user says "high" in the next user utterance while the user scenario is activated, a transition is performed toward a node with a node ID of 4 according to the rules, and a system utterance is generated. On the other hand, when the user says "virus" in the next user utterance, a transition is performed toward a node with a node ID of 2 according to the rules, and a system utterance is generated.

FIG. 6 shows an example of the user scenario based on AIML, but another notation may be used as long as the notation can determine a transition between nodes in the knowledge base 130 from the outside.

The input unit 100 receives an input of a user utterance. Then, the input unit 100 passes the received user utterance to the utterance understanding unit 110.

The utterance understanding unit 110 sets a current node from a plurality of nodes in the knowledge base 130, based on the scenario DB 140 and the input user utterance.

Specifically, the utterance understanding unit 110 first determines whether the user scenario is activated for the previous user utterance. The utterance understanding unit 110 determines whether the previous user utterance matches with the activation condition of the user scenario.

Then, when the previous user utterance matches with the activation condition of the user scenario, the utterance understanding unit 110 determines that the user scenario is activated and passes the user utterance to the knowledge transition unit 120 without performing other processing. The information that the user scenario is activated may be determined by receiving from the knowledge transition unit 120.

On the other hand, when the previous user utterance does not match with the activation condition of the user scenario or when the previous user utterance does not exist, the utterance understanding unit 110 determines whether the user utterance received by the input unit 100 matches with any node of the knowledge base 130, and sets the matched node as the current node.

Further, when the utterance understanding unit 110 does not perform other processing and the knowledge transition unit 120 determines, based on the user scenario and the user utterance, that the transition-destination node is not determined, the utterance understanding unit 110 determines that the user utterance matches with any node of the knowledge base 130, and sets the matched node as the current node.

Here, as a method of matching the user utterance with the node of the knowledge base 130, any method may be employed.

For example, similarly to a conventional method of using a dialogue scenario, a rule-based method of finding a word that matches between the utterance sentences of all nodes of the knowledge base 130 and the user utterance may be employed, and a method of calculating semantic similarity between the utterance sentence and the user utterance and using the node having the highest similarity may be employed.

Further, information indicating that the previous user utterance matches with any node may be used.

Here, the user utterance needs to match with any node of the knowledge base 130. When user utterance does not match with any node of the knowledge base 130, the node to be matched may be determined in advance.

Then, the utterance understanding unit 110 passes the user utterance and the ID of the set current node to the knowledge transition unit 120.

The knowledge transition unit 120 determines a transition-destination node in the knowledge base 130, based on the user utterance, the current node set by the utterance understanding unit 110, and the dialogue scenario.

Specifically, the knowledge transition unit 120 uses the user scenario preferentially to determine the transition-destination node in the knowledge base 130 based on the user utterance. In addition, when the transition-destination node is not determined using the user scenario, the knowledge transition unit 120 determines the transition-destination node based on the basic scenario, the user utterance, and the current node set by the utterance understanding unit 110.

First, the knowledge transition unit 120 checks the activated user scenario and determines whether the user scenario has a rule that matches with the condition.

When the user scenario has the rule that matches with the condition, the knowledge transition unit 120 determines a transition-destination node according to the user scenario. On the other hand, when the rule having the matching condition does not exist in the activated user scenario, the knowledge transition unit 120 determines the transition-destination node based on the transition priority described in the basic scenario.

In the user scenario shown in the example of FIG. 6, for example, when the user makes an utterance saying "I do not need a smartphone", the utterance matches with the activation condition of the user scenario. When the user scenario is activated, the system unconditionally performs an utterance of "Why don't you need it?".

In other words, the next transition-destination node is not determined, that is, the current node is set as the transition-destination node.

Then, the knowledge transition unit 120 passes an ID of the transition-destination node to the utterance generation unit 150.

In addition, when the transition-destination node is determined using the user scenario for the previous user utterance, the knowledge transition unit 120 uses the same user scenario preferentially to determine the transition-destination node in the knowledge base 130 based on the user utterance. When the transition-destination node is not determined using the same user scenario, the knowledge transition unit 120 uses the user scenario preferentially to determine the transition-destination node in the knowledge base based on the user utterance. When the transition-destination node is not determined using the user scenario, the knowledge transition unit 120 determines the transition-destination node in the knowledge base 130 based on the basic scenario, the user utterance, and the current node.

Specifically, in the user scenario shown in the example of FIG. 6, when a user utterance is received after the system utterance of "Why don't you need it?", since the utterance understanding unit 110 determines that the user scenario has been activated for the previous user utterance, it is possible to determine that the transition-destination node has been determined using the user scenario for the previous user utterance.

Next, the knowledge transition unit 120 determines a transition-destination node in the knowledge base 130, based on the user utterance, using the user scenario of FIG. 6 which is equal to the previous user scenario.

For example, the knowledge transition unit 120 performs a transition toward the node having the ID of 4 in the knowledge base 130 according to the rule when the next user utterance includes a word "high" in the user scenario of FIG. 6, and determines the node having the ID of 2 as the transition-destination node when the user utterance includes a word "virus".

On the other hand, the transition-destination node is not determined using the user scenario equal to the previous user scenario, the knowledge transition unit 120 uses another user scenario preferentially to determine the transition-destination node in the knowledge base 130 based on the user utterance. When the transition-destination node is not determined using the user scenario, the knowledge transition unit 120 determines the transition-destination node in the knowledge base 130 based on the basic scenario, the user utterance, and the current node.

For example, when the next user utterance does not include "high" or "virus" with respect to the system utterance of "Why don't you need it?" in the user scenario of FIG. 6, the knowledge transition unit 120 can determine that the transition-destination node is not determined using the user scenario equal to the previous user scenario.

At this time, since the current node is likely to be inappropriate, the knowledge transition unit 120 causes the utterance understanding unit 110 to set the current node based on the user utterance.

Next, the knowledge transition unit 120 checks another user scenario, and determines whether the user scenario has the matching activation condition.

When the user scenario having the matching activation condition exists, the knowledge transition unit 120 determines a transition-destination node according to the user scenario. On the other hand, when the user scenario having the matching activation condition does not exist, the knowledge transition unit 120 determines a transition-destination node based on the transition priority described in the basic scenario.

The knowledge transition unit 120 passes an ID of the determined transition-destination node to the utterance generation unit 150.

The knowledge transition unit 120 may receive a user utterance directly from the input unit 100 when a user scenario is activated.

In this case, the utterance understanding unit 110 does not need to determine whether the user scenario is activated, and does not perform the processing of the utterance understanding unit 110 as long as the transition-destination node can be determined based on the same user scenario.

The utterance generation unit 150 generates a system utterance based on the transition-destination node determined by the knowledge transition unit 120.

Specifically, the utterance generation unit 150 determines a system utterance based on knowledge of the transition-destination node. When knowledge of the node in the knowledge base 130 is the utterance sentence itself, the content of the node may be used as a system utterance.

In addition, the utterance generation unit 150 may be configured to acquire an utterance sentence corresponding to the knowledge included in the transition-destination node from an external database (not shown), and, in this case, performs a process of acquiring an utterance sentence and generating a system utterance with reference to the external database.

Here, the utterance generation unit 150 can also add information to a final system utterance according to the content of the transitioned edge.

In the example of FIG. 3, for example, when performing a transition to a node connected by an edge of which relation label is [disproof] in response to a user utterance "the smartphone has a high model cost" and generating an utterance sentence "it is cheaper than PC" of the transition-destination node, the utterance generation unit 150 adds a conjunction "but" corresponding to the disproof, and generates a system utterance "but it is cheaper than PC", thereby realizing a more relevant dialogue.

Besides, the utterance generation unit 150 may perform processing such as conversion of endings in consideration of characterization of a dialogue system.

Then, the utterance generation unit 150 passes the generated system utterance to the output unit 160.

The output unit 160 outputs the system utterance generated by the utterance generation unit 150. For example, the output unit displays the system utterance on a user interface on which a dialogue system is displayed.

<Example of Dialogue in Dialogue Device According to Embodiment of the Present Invention>

Figure 7:
FIG. 7 is an image view showing an example of a dialogue in the dialogue device according to the embodiment of the present invention.
Figure 7:
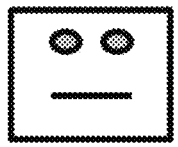
Figure 7:
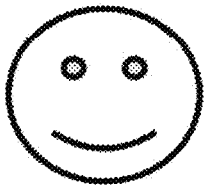
Figure 7:
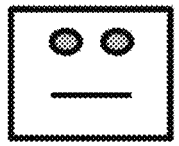
Figure 7:
Figure 7:
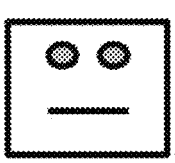

An example of a dialogue in the dialogue device 10 according to the present embodiment will be described with reference to FIG. 7. FIG. 7 is an image view showing an example of a dialogue in the dialogue device 10 according to the present embodiment.

In the example of the dialogue, the contents of the knowledge base 130 and the scenario DB 140 use FIGS. 3, 5, and 6. In FIG. 7, a round face character indicates a user, a square face character indicates a dialogue system, an utterance of the user is a user utterance, and an utterance of the dialogue system is a system utterance. In addition, the dialogue in FIG. 7 is made from top to bottom.

First, when the user utters "I don't need a smartphone", since the user utterance matches with the activation condition of the user scenario in FIG. 6, the system unconditionally replies "Why don't you need it?".

Next, when the user utters "I'm afraid of a virus", since the user utterance matches with the condition of "virus" in the rules of the activated user scenario, the system determines node 2 which is a transition destination described in the rule as a transition-destination node.

Since the next user utterance "a terminal is expensive" does not match with the condition in the rules of the activated user scenario, the system determines a transition destination using the basic scenario. At this time, the user utterance "a terminal is expensive" matches with "a smartphone has a high model cost" of node 1 of the knowledge base 130 in FIG. 3, as a result of the determination in the utterance understanding unit 110.

Therefore, according to the priority of the [subject] field in the basic scenario of FIG. 5, the system performs a transition to node 4 such that node 4 of "It is cheaper than PC" satisfies the condition of "disproof: object", and replies an utterance "but, it is cheaper than PC" to which "but" indicating the disproof is added.

<Operation of Dialogue Device According to Embodiment of the Present Invention>

Figure 8:
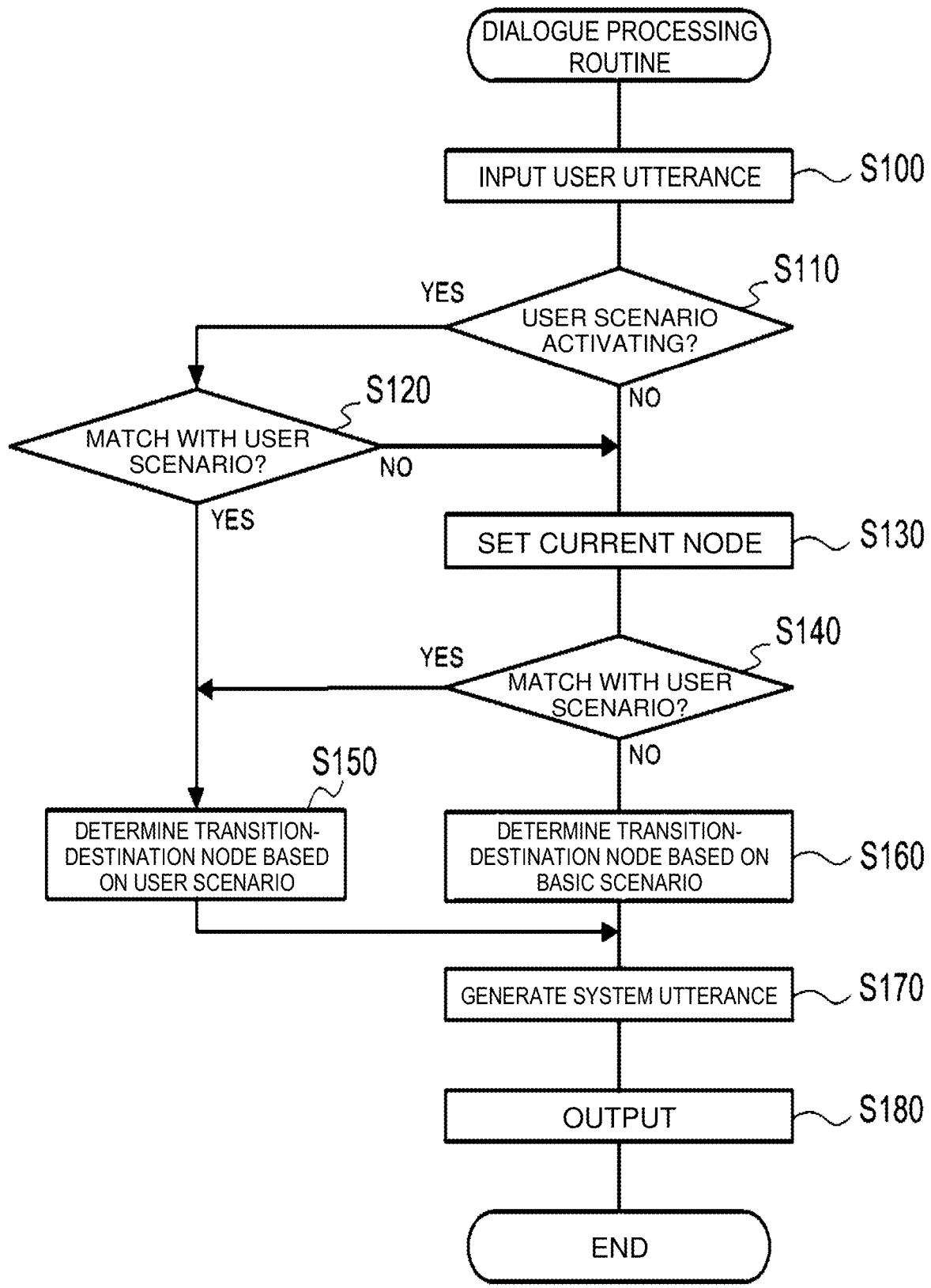
FIG. 8 is a flowchart showing a dialogue processing routine of the dialogue device according to the embodiment of the present invention.

FIG. 8 is a flowchart showing a dialogue processing routine according to the embodiment of the present invention.

When a user utterance is input to the input unit 100, the dialogue device 10 executes a dialogue processing routine shown in FIG. 8.

First, the input unit 100 receives an input of a user utterance in step S100.

In step 110, the utterance understanding unit 110 determines whether a user scenario is activated by the previous user utterance.

When the user scenario is activated (YES in step S110), the knowledge transition unit 120 checks the activated user scenario and determines in step 120 whether a rule matching with a condition exists.

When the activated user scenario has the rule that matches with the condition (YES in step S120), the process proceeds to step S150. On the other hand, when the activated user scenario does not have the rule that matches with the condition (NO in step S120), the process proceeds to step S130.

In addition, when the user scenario is not activated (NO in step S110), the process proceeds to step S130.

In step 130, the utterance understanding unit 110 sets the current node from the plurality of nodes of the knowledge base 130 based on the scenario DB 140 and the user utterance received in step S100.

In step 140, the knowledge transition unit 120 checks the user scenario, and determines whether the user scenario has the matching activation condition.

When the user scenario having the matching activation condition exists (YES in step S140), the knowledge transition unit 120 determines in step 150 a transition-destination node according to the user scenario, and the process proceeds to step S170.

On the other hand, when the user scenario having the matching activation condition does not exist (NO in step S140), the knowledge transition unit 120 determines in step 160 a transition-destination node based on the transition priority described in the basic scenario, and the process proceeds to step S170.

In step 170, the utterance generation unit 150 generates a system utterance based on the knowledge included in the transition-destination node determined in step S150 or S160.

In step 180, the output unit 160 outputs the system utterance generated in step S170.

As described above, according to the dialogue device of the present embodiment, it is possible to realize various dialogue while reducing the amount of description of the dialogue scenario by determining a next type of knowledge based on: the knowledge about each of utterances; the knowledge base including the relation labels indicating relations between the utterances; the user utterance; the current knowledge; and the dialogue scenario including the basic scenario in which the transition method between the plurality of types of knowledge in the knowledge base is determined using the relation label, and generating the system utterance based on the next type of knowledge.

The present invention is not limited to the above-described embodiment, and various modifications and applications can be made without departing from the scope of the present invention.

Although the knowledge base is represented by a tree structure including nodes and edges in the above-described embodiment, the knowledge base does not necessarily have the tree structure and may have any structure such as a list structure as long as the knowledge relating to the utterance and the relation between various types of knowledge can be defined.

In addition, the embodiment is described in the description of this application in which the program is installed in advance, but the program may be provided in a state being stored in a computer-readable recording medium.

REFERENCE SIGNS LIST

10 Dialogue device
100 Input unit
110 Utterance understanding unit
120 Knowledge transition unit
130 Knowledge base
140 Scenario DB
150 Utterance generation unit
160 Output unit

The invention claimed is:

1. A computer-implemented method for processing a dialogue, the method comprising:
 receiving an input utterance in a dialogue;
 determining, based on the received input utterance, a first type of knowledge in the plurality of types of knowledge in a knowledge base,
  wherein the knowledge base includes:
   the first type of knowledge associated with a first utterance,
   a second type of knowledge associated with a second utterance, and
   one or more relation labels respectively indicating a relationship between a type of knowledge and another type of knowledge, the one or more relation labels include a first relation label indicating a first relationship between the first type of knowledge and the second type of knowledge, and the first relationship indicates the second type of knowledge being a reason for the first type of knowledge;
 retrieving, based on the first type of knowledge, a rule specifying the first relationship in a basic scenario from a scenario database indexed by at least an attribute of the first type of knowledge, wherein the scenario database includes a dialogue scenario, the dialogue scenario includes the basic scenario, the basic scenario specifies one or more rules for transitioning among a plurality of types of knowledge in the knowledge base based on ranked relation labels during the dialogue, and the one or more rules include the rule with a ranked relation label specifying the first relationship for transitioning from the first type of knowledge to a next type of knowledge;
 determining, based at least on a combination of the received user utterance, the first type of knowledge, and the first relation label matched with the ranked relation label based on the first relationship specified by the rule in the basic scenario, the second type of knowledge as the next type of knowledge for transitioning;
 automatically generating, based on the second type of knowledge, an output utterance as a response to the input utterance; and
 providing the generated output utterance in response to the input utterance in the dialogue.

2. The computer-implemented method of claim 1, wherein the types of knowledge relate to at least one of a subject matter and an objective fact, and
 wherein the one or more relation labels respectively indicate the relationship further including one of:
  disproof,
  supplement, or
  reason.

3. The computer-implemented method of claim 1, wherein the dialogue scenario in the scenario database further includes a user scenario, wherein the user scenario indicates one or more transitions among the plurality of types of knowledge in the knowledge base based on content of respective dialogues, and the method further comprising:
 determining, based on the received input utterance and a priority of using the user scenario over the basic scenario, a third type of knowledge for transition for generating the output utterance, wherein the user scenario includes the first type of knowledge associated with the third type of knowledge for transition; and
 when the third type of knowledge is undeterminable using the user scenario, generating, based at least on a combination of the basic scenario, the received input utterance, and the first type of knowledge, the output utterance base on the second type of knowledge for the transition.

4. The computer-implemented method of claim 3, wherein the user scenario includes content of the input utterance as a first node, content of the output utterance a second node in response to the input utterance, and a predefined rule for selecting the user scenario, and wherein the user scenario includes a node identifier for specifying a third node in the user scenario to transfer from the first node.

5. The computer-implemented method of claim 3, wherein the knowledge base is a source of information for the output utterance, wherein the dialogue scenario determines a dialogue strategy based at least on the basic scenario or the user scenario, and the knowledge base being distinct from the dialogue scenario.

6. The computer-implemented method of claim 3, the method further comprising:
receiving a previous utterance, the previous utterance preceding the input utterance;
when the previous utterance satisfies a predetermined condition based on the user scenario, determining the second type of knowledge for the transition based on the received input utterance using the user scenario as the priority; and
when the second type of knowledge for the transition is undeterminable using the user scenario, determining the second type of knowledge for the transition based on a combination of the basic scenario, the received input utterance, and the first type of knowledge.

7. The computer-implemented method of claim 6, wherein the basic scenario includes a first description of how to transition from a type of knowledge to another type of knowledge, and wherein the user scenario includes a second description of how to transition from the input utterance to the output utterance.

8. A system for processing a dialog, the system comprises:
a processor; and
a memory storing computer-executable instructions that when executed by the processor cause the system to:
receive an input utterance in a dialogue;
determine, based on the received input utterance, a first type of knowledge in the plurality of types of knowledge in a knowledge base,
wherein the knowledge base includes:
the first type of knowledge associated with a first utterance,
a second type of knowledge associated with a second utterance, and
one or more relation labels respectively indicating a relationship between a type of knowledge and another type of knowledge, and the one or more relation labels include a first relation label indicating a first relationship between the first type of knowledge and the second type of knowledge;
retrieving, based on the first type of knowledge, a rule specifying the first relationship in a basic scenario from a scenario database indexed by at least an attribute of the first type of knowledge, wherein the scenario database includes a dialogue scenario, the dialogue scenario includes the basic scenario, the basic scenario specifies one or more rules for transitioning among a plurality of types of knowledge in the knowledge base based on ranked relation labels during the dialogue, and the one or more rules include the rule with a ranked relation label specifying the first relationship for transitioning from the first type of knowledge to a next type of knowledge;
determine, based at least on a combination of the received user utterance, the first type of knowledge, and the first relation label matched with the ranked relation label based on the first relationship specified by the rule in the basic scenario, the second type of knowledge as the next type of knowledge for transitioning;
automatically generate, based on the determined second type of knowledge, an output utterance as a response to the input utterance; and
provide the generated output utterance in response to the input utterance in the dialogue.

9. The system of claim 8, wherein the types of knowledge relate to at least one of a subject matter and an objective fact, and
wherein the one or more relation labels respectively indicate the relationship further including one of:
disproof,
supplement, or
reason.

10. The system of claim 8, wherein the dialogue scenario in the scenario database further includes a user scenario, wherein the user scenario indicates one or more transitions among the plurality of types of knowledge in the knowledge base based on content of respective dialogues, and the computer-executable instructions when executed further causing the system to:
determine, based on the received input utterance and a priority of using the user scenario over the basic scenario, a third type of knowledge for transition for generating the output utterance, wherein the user scenario includes the first type of knowledge associated with the third type of knowledge for transition; and
when the third type of knowledge is undeterminable using the user scenario, generate, based at least on a combination of the basic scenario, the received input utterance, and the first type of knowledge, the output utterance base on the second type of knowledge for the transition.

11. The system of claim 10, wherein the user scenario includes content of the input utterance as a first node, content of the output utterance a second node in response to the input utterance, and a predefined rule for selecting the user scenario, and wherein the user scenario includes a node identifier for specifying a third node in the user scenario to transfer from the first node.

12. The system of claim 10, wherein the knowledge base is a source of information for the output utterance, wherein the dialogue scenario determines a dialogue strategy based at least on the basic scenario or the user scenario, and the knowledge base being distinct from the dialogue scenario.

13. The system of claim 10, the computer-executable instructions when executed further causing the system to:
receive a previous utterance, the previous utterance preceding the input utterance;
when the previous utterance satisfies a predetermined condition based on the user scenario, determine the second type of knowledge for the transition based on the received input utterance using the user scenario as the priority; and
when the second type of knowledge for the transition is undeterminable using the user scenario, determine the second type of knowledge for the transition based on a combination of the basic scenario, the received input utterance, and the first type of knowledge.

14. The system of claim 13, wherein the basic scenario includes a first description of how to transition from a type of knowledge to another type of knowledge, and wherein the user scenario includes a second description of how to transition from the input utterance to the output utterance.

15. A computer-readable non-transitory recording medium storing computer-executable instructions that when executed by a processor cause a computer system to:
receive an input utterance in a dialogue;
determine, based on the received input utterance, a first type of knowledge in the plurality of types of knowledge in a knowledge base, wherein the knowledge base includes:
the first type of knowledge associated with a first utterance,
a second type of knowledge associated with a second utterance, and
one or more relation labels respectively indicating a relationship between a type of knowledge and another type of knowledge, and the one or more relation labels include a first relation label indicating a first relationship between the first type of knowledge and the second type of knowledge;
retrieving, based on the first type of knowledge, a rule specifying the first relationship in a basic scenario from a scenario database indexed by at least an attribute of the first type of knowledge, wherein the scenario database includes a dialogue scenario, the dialogue scenario includes the basic scenario, and the basic scenario specifies one or more rules for transitioning among a plurality of types of knowledge in the knowledge base based on ranked relation labels during the dialogue, and the one or more rules include the rule with a ranked relation label specifying the first relationship for transitioning from the first type of knowledge to a next type of knowledge;
determine, based at least on a combination of the received user utterance, the first type of knowledge, and the first relation label matched with the ranked relation label based on the first relationship specified by the rule in the identified basic scenario, the second type of knowledge as the next type of knowledge for transitioning;
automatically generate, based on the second type of knowledge, an output utterance as a response to the input utterance; and
provide the generated output utterance in response to the input utterance in the dialogue.

16. The computer-readable non-transitory recording medium of claim 15, wherein the types of knowledge relate to at least one of a subject matter and an objective fact; and
wherein the one or more relation labels respectively indicate the relationship further including one of:
disproof,
supplement, or
reason.

17. The computer-readable non-transitory recording medium of claim 15, wherein the dialogue scenario in the scenario database further includes a user scenario, wherein the user scenario indicates one or more transitions among the plurality of types of knowledge in the knowledge base based on content of respective dialogues, and the computer-executable instructions when executed further causing the system to:
determine, based on the received input utterance and a priority of using the user scenario over the basic scenario, a third type of knowledge for transition for generating the output utterance, wherein the user scenario includes the first type of knowledge associated with the third type of knowledge for transition; and
when the third type of knowledge is undeterminable using the user scenario, generate, based at least on a combination of the basic scenario, the received input utterance, and the first type of knowledge, the output utterance base on the second type of knowledge for the transition.

18. The computer-readable non-transitory recording medium of claim 17, wherein the user scenario includes content of the input utterance as a first node, content of the output utterance a second node in response to the input utterance, and a predefined rule for selecting the user scenario, and wherein the user scenario includes a node identifier for specifying a third node in the user scenario to transfer from the first node.

19. The computer-readable non-transitory recording medium of claim 17, wherein the knowledge base is a source of information for the output utterance, wherein the dialogue scenario determines a dialogue strategy based at least on the basic scenario or the user scenario, and the knowledge base being distinct from the dialogue scenario.

20. The computer-readable non-transitory recording medium of claim 17, the computer-executable instructions when executed further causing the system to:
receive a previous utterance, the previous utterance preceding the input utterance;
when the previous utterance satisfies a predetermined condition based on the user scenario, determine the second type of knowledge for the transition in the knowledge based on the received input utterance using the user scenario as the priority; and
when the second type of knowledge for the transition is undeterminable using the user scenario, determine the second type of knowledge for the transition based on a combination of the basic scenario, the received input utterance, and the first type of knowledge.

* * * * *